United States Patent [19]
Zimmerman et al.

[11] 3,986,289
[45] Oct. 19, 1976

[54] EXPANDABLE FISH HOOK

[76] Inventors: Jessie G. Zimmerman, 1742 N. Rural, Indianapolis, Ind. 46218; Robert T. Snider, 1452 English, Indianapolis, Ind. 46201

[22] Filed: Sept. 11, 1975

[21] Appl. No.: 612,308

Related U.S. Application Data
[63] Continuation-in-part of Ser. No. 471,461, May 20, 1974, abandoned.

[52] U.S. Cl. .................................... 43/36; 43/37
[51] Int. Cl.² .......................................... A01K 83/02
[58] Field of Search .......... 43/34, 35, 36, 37, 42.74

[56] References Cited
UNITED STATES PATENTS

| | | | |
|---|---|---|---|
| 1,046,302 | 12/1912 | Jass | 43/36 |
| 1,371,128 | 3/1921 | Sturgis | 43/36 |
| 1,623,870 | 4/1927 | Goodgame | 43/36 |
| 3,376,662 | 4/1968 | Harris | 43/36 |

FOREIGN PATENTS OR APPLICATIONS

| | | | |
|---|---|---|---|
| 1,162,729 | 8/1969 | United Kingdom | 43/37 |

Primary Examiner—Warner H. Camp
Attorney, Agent, or Firm—Woodard, Weikart, Emhardt & Naughton

[57] ABSTRACT

An expandable fish hook. A plurality of fish hooks have top ends fastened together with means slidably mounted to and encircling the shanks of the fish hooks. The fish hooks are biased apart and are movable together when the means is positioned adjacent the barbed ends of the fish hooks. A fishing line attached to the means extends through an eyelet formed at the top ends of the fish hooks with the means being slidably moved by the line toward the eyelet thereby allowing the fish hooks to spread apart.

5 Claims, 10 Drawing Figures

EXPANDABLE FISH HOOK

CROSS REFERENCE TO RELATED APPLICATION

This application is a continuation-in-part of U.S. Pat. Application Ser. No. 471,461, filed May 20, 1974 and now abandoned.

BACKGROUND OF THE INVENTION

1. Field of the Invention

This invention is in the field of fishing hooks.

2. Description of the Prior Art

Expandable fishing hook assemblies are known. For example, expandable fish hook assemblies are disclosed in the U.s. Pat. Nos. 2,526,288 issued to Shields et al and 2,783,580 issued to Balboni, in the Canadian Pat. No. 613,882 issued to Laba and the German Patent 114,743 issued to Johansson. A problem with many of the prior art expandable fishing hook assemblies is the possibility of one or more of the fishing hooks turning sideways with respect to the fishing hook assembly as the hooks are being expanded in the mouth of the fish thereby allowing for the fish to become disengaged from the hook. Disclosed herein is an expandable fish hook assembly which includes means through which the shanks of the hooks extend preventing the hooks from turning sideways.

SUMMARY OF THE INVENTION

One embodiment of the present invention is an expandable fish hook apparatus comprising a plurality of fish hooks having shanks with top ends connected together and barbed bottom ends with the shanks being normally biased apart in an expanded position and converging from said barbed bottom ends to said top ends, means through which the shanks project with the means being slidable from the bottom ends to the top ends, the means being sized and configured to prevent the hooks from turning sideways and further when said means is at the bottom ends the means forces the bottom ends together from said expanded position, a line attached to the means and extending past the top ends, the line when parallel forces the means from the barbed bottom ends to the top ends allowing the barbed bottom ends to move to said expanded position.

It is an object of the present invention to provide a new and improved expandable fish hook apparatus.

A further object of the present invention is to provide an expandable fish hook apparatus which prevents the individual hooks from turning sideways.

Related objects and advantages of the present invention will be apparent from the following description.

DESCRIPTION OF THE PREFERRED EMBODIMENTS

Figure 1:
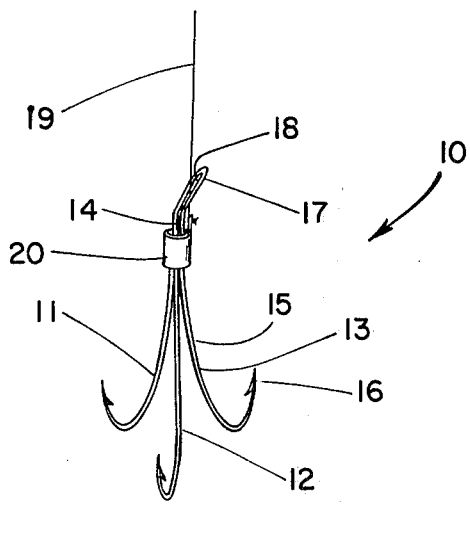
FIG. 1 is a perspective view of an expandable fish hook apparatus incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown an expandable fish hook apparatus 10 including three fish hooks 11, 12 and 13. The three fish hooks have longitudinally extending shanks with top ends 14 fixedly secured together and barbed bottom ends. For example, fish hook 13 includes shank 15 with a barbed bottom end 16 and a top end 14. The shanks are normally biased apart and converge in the direction extending from the bottom barbed ends to the top ends. A looped rod 17 is formed on the top ends 14 of the fishing hooks. Looped rod 17 includes an aperture 18 through which fishing line 19 extends.

Figure 2:
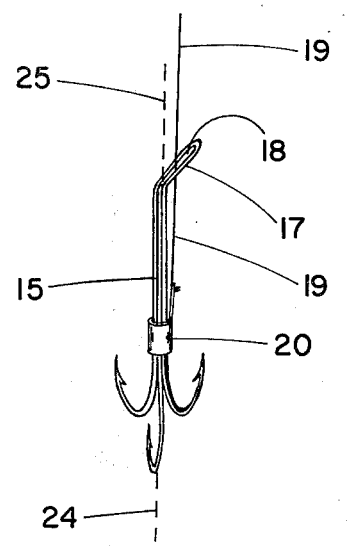
FIG. 2 is the same view as FIG. 1 only showing the fish hook apparatus in the non-expanded position.
Figure 3:
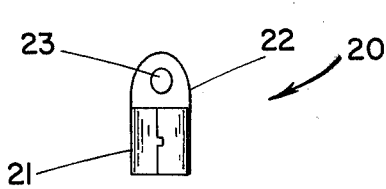
FIG. 3 is an enlarged side view of the sleeve mounted to the fish hook shanks of FIGS. 1 and 2.

Sleeve 20 includes a generally cylindrical and hollow main body 21 through which the shanks project with the sleeve being slidably mounted on the fish hooks and being movable from a position adjacent the barbed bottom ends to the top ends 14. The sleeve is sized so as to force the shanks together when the sleeve is positioned adjacent the barbed bottom ends as shown in FIG. 2. Line 19 is attached to tab 22 of sleeve 20 with the line then extending upwardly through eyelet 18. As the line is pulled, the sleeve is forced from the barbed bottom ends toward the eyelet allowing the barbed bottom ends to expand as shown in FIG. 1. An aperture 23 is provided on tab 22 to allow for attachment of line 19. In the embodiment shown in the drawing, the top ends 14 are soldered together with looped rod 17 soldered to the top ends of the fishing hook.

Shanks 15 are parallel along longitudinal axis 24-25 when sleeve 20 is positioned at the bottom ends. Of course, as the sleeve moves upwardly toward the eyelet, the shanks of the fishing hooks assume a nonparallel relationship. Looped rod 17 extends outwardly at an acute angle with respect to axis 24-25 thereby positioning eyelet 18 outwardly of the shanks and allowing line 19 to extend along a straight path from sleeve 20 through aperture 18.

Figure 4:
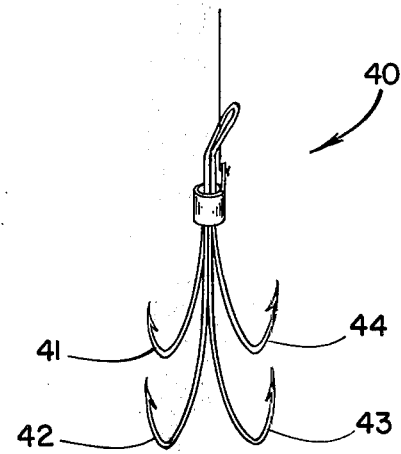
FIG. 4 is the same view as FIG. 1 only showing an alternate embodiment of the fishing hook apparatus.
Figure 5:
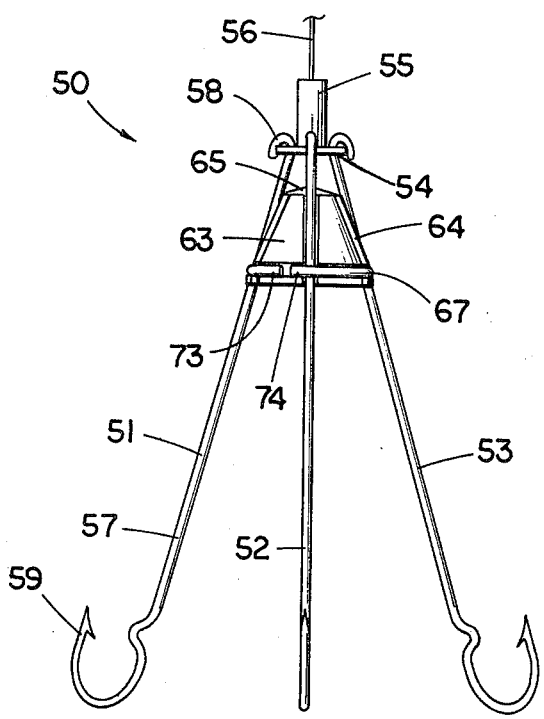
FIG. 5 is a side view of the preferred embodiment of an expandable fish hook apparatus incorporating the present invention.
Figure 6:
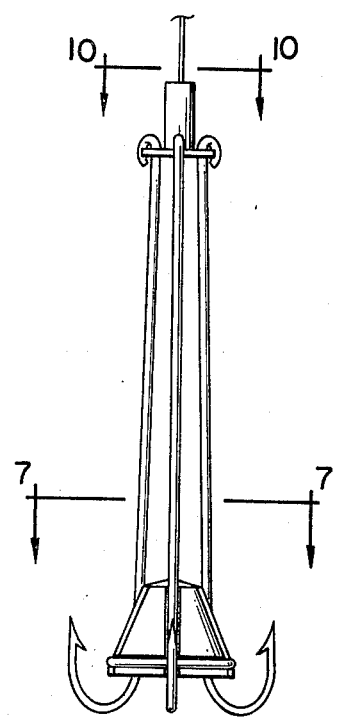
FIG. 6 is the same view as FIG. 5 only showing the fish hook apparatus in a non-expanded position.
Figure 7:
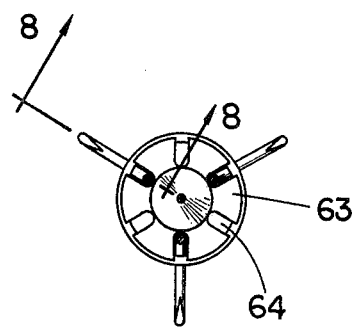
FIG. 7 is an enlarged cross-sectional view taken along the line 7—7 of FIG. 6 and viewed in the direction of the arrows.

An alternate embodiment of the fish hook apparatus is shown in FIG. 4. Apparatus 40 is identical with apparatus 10 with the exception that apparatus 40 includes four fish hooks 41 through 44 in lieu of the three hook arrangement shown in FIG. 1. The sleeve mounted to the four fish hook assembly 40 is identical with sleeve 20 with the exception, of course, that the internal diameter is slightly larger to accommodate four shanks.

The preferred embodiment of the fish hook apparatus is shown in FIGS. 5 through 9. Apparatus 50 includes three fish hooks, 51, 52 and 53 pivotally mounted to plate 54. A sleeve 55 is integrally mounted atop plate 54 with fishing line 56 extending through sleeve 55 and a center aperture in plate 54.

Hook 51 will now be described as being understood that a similar description applies to hooks 52 and 53. Hook 51 has a shank 57 with a top end 58 and a barbed bottom end 59. The top end 58 of hook 51 extends through hole 60 of plate 54 and then curls outwardly around the circumferentially extending edge portion 61 of the plate which places the shank of fish hook 51 immediately adjacent the center aperture 62 of plate 54. A plurality of apertures are provided immediately inward the circumferentially extending edge portion of plate 54 to pivotally receive the top ends of fish hooks 51 through 53. By pivotally mounting the top ends of each fish hook, the fish hooks may move from the non-expanding position shown in FIG. 6 to the expanded position shown in FIG. 5.

A slide 63 (FIG. 5) is provided with a plurality of channels 64 through which the fish hook shank extends. The top end 65 of slide 63 is fixedly attached to line 56. As a result, the apparatus is in the non-expanded position in FIG. 6, and further when a fish bites the barbed bottom ends of the hooks and pulls, line 56 will pull slide 63 upwardly with respect to the barbed bottom ends eventually forcing the fish hook to the expanded position shown in FIG. 5.

Slide 63 has an external conical configuration with a separate channel 64 provided for receiving a separate hook. Many variations are contemplated and included in the slide. For example, only three fish hooks are shown in the drawings with the slide provided with six separate channels. Thus, only three channels are actually used in the apparatus shown in the drawings with the slide having the capability for the addition of more fish hooks to the plate 54.

Figure 8:
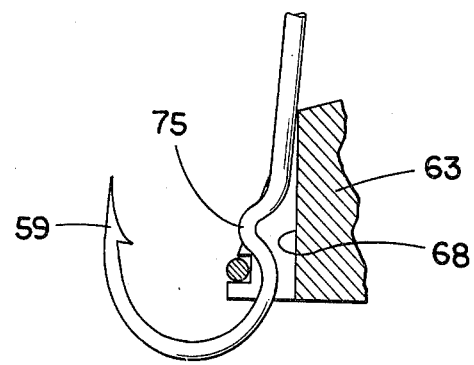
FIG. 8 is an enlarged fragmentary cross-sectional view taken along the line 8—8 of FIG. 7 and viewed in the direction of the arrows.
Figure 9:
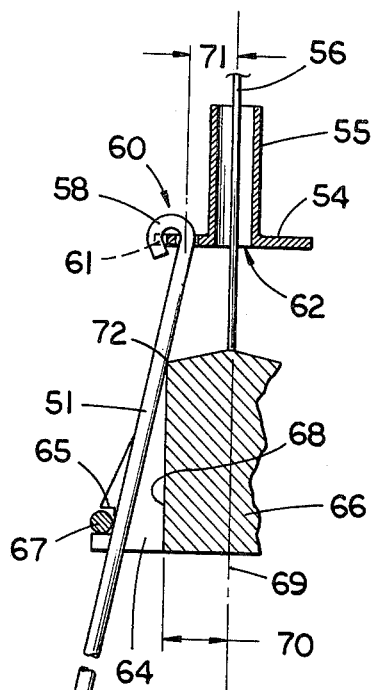
FIG. 9 is the same view as FIG. 8 only showing one of the hooks in an expanded position corresponding to FIG. 5.

A continuous groove 65 is provided at the bottom end 66 of the slide with the groove removably receiving a retaining ring 67 limiting outward movement of the fish hook. Each channel 64 (FIG. 9) has an outwardly facing stop surface 68 positioned inwardly of the shank of the fish hook and extending the length of each channel being parallel with the longitudinal center axis 69 extending through hole 62 of plate 54 and extending centrally through the slide. The stop surface 68 of each channel 64 is located an equal radial distance 70 from longitudinal axis 69. On the other hand, apertures 60 and plate 54 are located an equal radial distance 71 from the longitudinal center axis 69 with distance 71 being less than distance 70. As a result, with the slide in the upward position, each fish hook will extend skewedly through each channel 64 contacting the top end 72 of stop surface 68 while simultaneously contacting ring retainer 67. The fish hooks, however, extend essentially parallel and adjacent stop surface 68 when slide 63 is located in the downward position. Due to the fact that distance 71 is less than distance 70, the fish hooks will still extend skewedly through the channels when the slide is in the downward position; however, due to the remoteness of slide 63, relative to plate 54, the fish hook shanks will extend essentially parallel through the channels adjacent stop surface 68 as shown in FIG. 8.

Ring 67 has opposite ends 73 and 74 normally positioned close together (FIG. 5) but which may be moved considerably apart allowing for the removal of the ring from slide 63 for the addition or subtraction of fish hooks. Each shank includes a projection 75 formed thereon adjacent the barbed bottom end 59 with the projection positioned in channels 64 when the hooks are non-expanded. The projections contact ring 67 yieldably resisting movement of the slide relative to the fish hooks' shanks. As the fish tugs on the hooks, sufficient force must be applied by the fish until the projections move past ring 67 resulting in the sudden expansion of the apparatus.

Figure 10:
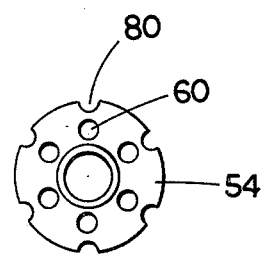
FIG. 10 is a cross-sectional view taken along the line 10—10 of FIG. 6 and viewed in the direction of the arrows without the hooks attached.

The fish hooks are normally biased apart when in the expanded position and converge from the barbed bottom ends to the top ends of the fish hooks. Slide 63 and plate 54 are sized and configured to prevent the hooks from turning sideways. For example, a notch 80 is provided at the outside edge portion of plate 54 (FIG. 10) immediately adjacent each hole 60. Thus, the top end 58 of each hook extends first through hole 60 and then around the circumferentially extending edge portion of the plate with the top end extending through notch 80. Notch 80 limits sideways movement of the top end of each hook. In addition, the width of each channel 64 is slightly greater than the diameter of the shank of each hook. With projection 75 extending outwardly, the shank is prevented from rotating within the channel since projection 75 will abut against the side surface of each channel.

Longitudinal axis 69 extends through the point of attachment of line 56 to slide 63. Distance 70 is greater than distance 71 assuring that the hooks expand when the slide is in the upward position.

The retainer ring is produced from a material having spring-like properties such as spring steel. Thus, the retaining ring will be a spring ring yieldably resisting upward movement of the slide until the ring moves past the projection on the fish hook.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. An expandable fish hook comprising:
   a plurality of fish hooks having shanks with top ends connected together and barbed bottom ends, said shanks being normally biased apart when in an expanded position and converging from said barbed bottom ends to said top ends;
   means through which said shanks project with said means being slidable from said bottom ends to said top ends, said means being sized and configured to prevent said hooks from turning sideways and further when said means is at said bottom ends said means forces said bottom ends together from said expanded position;
   a line attached to said means and extending past said top ends, said line when pulled forces said means from said bottom ends to said top ends allowing said bottom ends to move to said expanded position;

said means includes a slide with a top end and a bottom end and movably mounted to said shanks, said slide includes a separate channel slidably receiving a separate one of said shanks;

said means further includes a retainer locking each shank in each channel;

a plate having a center aperture through which said line extends, said top ends of said shanks are pivotally mounted to said plate with each of said top ends spaced apart a fixed radial distance from said center aperture;

said slide includes a central longitudinal axis extending through the point of attachment of said slide to said line;

each of said channels are spaced apart from said axis a radial distance greater than said fixed radial distance of said plate forcing said hooks divergingly apart when said slide is moved toward and adjacent said plate;

said plate has a sleeve attached thereto and extending thereabove surrounding said center aperture and forming a guide for said line, said plate has a plurality of holes surrounding said sleeve, said top ends of said shanks extend through said holes and then curl outwardly around the circumferentially extending edge portion of said plate positioning said shanks immediately adjacent said center aperture;

said circumferentially extending edge portion includes a plurality of notches through which said top ends of said shanks extend;

each channel has an outwardly facing stop surface positioned inwardly of said shanks and extending the length of each channel;

said retainer is a ring removably mounted to said slide and spaced apart from said stop surface of each channel to allow said shanks to move to said expanded position extending through said channels skewedly contacting said stop surface only at said top end of said slide when expanded and contacting said ring at said bottom end of said slide.

2. The fish hook apparatus of claim 1 wherein:

said shanks include projections formed thereon adjacent said barbed bottom ends, said projections are positioned in said channels when said hooks are non-expanded with said projections contacting said ring yieldably resisting movement between said slide and said shanks.

3. An expandable fish hook apparatus comprising:

a plurality of fish hooks having shanks with top ends connected together and barbed bottom ends, said shanks being normally biased apart when in an expanded position and converging from said barbed bottom ends to said top ends;

a slide with a top end and a bottom end and movably mounted to said shanks, said slide includes a separate channel slidably receiving a separate one of said shanks, said slide having means to receive a line with said line extending upwardly from said slide past said top ends, said line when pulled forces said slide from said bottom ends to said top ends allowing said bottom ends to move to said expanded position;

each channel having an outwardly facing stop surface positioned inwardly of said shanks and extending the length of each channel;

said slide having retaining means at said bottom end and spaced apart from said stop surface of each channel to allow said shanks to move to said expanded position extending through said channels skewedly contacting at least a portion of said stop surface of said slide when expanded and contacting said retaining means at said bottom end of said slide.

4. The expandable fish hook apparatus of claim 3 wherein:

said shanks include projections formed thereon adjacent said barbed bottom ends, said projections are positioned in said channels when said hooks are non-expanded with said projections contacting said retaining means yieldably resisting movement between said slide and said shanks.

5. An expandable fish hook apparatus comprising:

a plurality of fish hooks having shanks with top ends connected together and barbed bottom ends, said shanks being normally biased apart when in an expanded position and converging from said barbed bottom ends to said top ends;

a slide with a top end and a bottom end and movably mounted to said shanks, said slide includes a separate channel slidably receiving a separate one of said shanks, said slide having means to receive a line with said line extending uwardly from said slide past said top ends, said line when pulled forces said slide from said bottom ends to said top ends allowing said bottom ends to move to said expanded position;

each channel having an outwardly facing stop surface positioned inwardly of said shanks and extending the length of each channel;

said slide having a retainer ring removably mounted thereto and spaced apart from said stop surface of each channel to limit outward movement of said shanks and to allow said shanks to move to said expanded position, said retainer ring being removable to facilitate removal of said fish hooks.

* * * * *